(12) United States Patent
Ferman

(10) Patent No.: US 8,434,880 B2
(45) Date of Patent: May 7, 2013

(54) MIRROR DAMPER

(76) Inventor: Michael Ferman, Peakhurst (AU)

( * ) Notice: Subject to any disclaimer, the term of this patent is extended or adjusted under 35 U.S.C. 154(b) by 267 days.

(21) Appl. No.: 12/918,470

(22) PCT Filed: Feb. 20, 2009

(86) PCT No.: PCT/AU2009/000189
§ 371 (c)(1),
(2), (4) Date: Aug. 24, 2010

(87) PCT Pub. No.: WO2009/103117
PCT Pub. Date: Aug. 27, 2009

(65) Prior Publication Data
US 2010/0328795 A1  Dec. 30, 2010

(30) Foreign Application Priority Data
Feb. 22, 2008 (AU) ................................ 2008900842

(51) Int. Cl.
*G02B 5/08* (2006.01)
*G02B 7/182* (2006.01)

(52) U.S. Cl.
USPC ................................... 359/844; 359/872

(58) Field of Classification Search .............. 359/844
See application file for complete search history.

(56) References Cited

U.S. PATENT DOCUMENTS
7,441,911 B2 * 10/2008 Ruse et al. ............... 359/841
2007/0177285 A1 * 8/2007 Lewis ....................... 359/841

FOREIGN PATENT DOCUMENTS
CA      2043982      7/1992

* cited by examiner

*Primary Examiner* — Jade R Chwasz
(74) *Attorney, Agent, or Firm* — Michael Molins

(57) ABSTRACT

A damper is provided for a rear view mirror with motorized actuation. A damper is provided between the mirror and its frame assembly for the purpose of shock absorption or vibration reduction. Each damper comprises a bracket and a boss. A polymer contact material such as an O-ring 24 is mounted onto the free end of the bracket and contacts the boss. The frictional and elastic properties etc. of the contact material determine the damping and frictional characteristics of the movement of the mirror with respect to the boss.

11 Claims, 4 Drawing Sheets

MIRROR DAMPER

FIELD OF THE INVENTION

The present technology relates to dampers, in particular, mirror dampers for vehicles.

BACKGROUND OF THE INVENTION

Mirrors, such as adjustable and motorised or manual side view mirrors or rear view mirrors, are fitted on motor vehicles so that drivers can perform safety checks while driving. Some of these mirrors may be electrically powered and controlled. The mirrors may vibrate when the vehicle to which they are attached is in motion. The vibration may cause poor visibility for the driver, a loosening and also the gradual wearing out of the parts used for the mirrors, for example those used to support the mirrors on the vehicle or those used to power or control electric mirrors. Minimization of the vibration is desirable and, inter alia, helps mechanically protect various components used for the mirrors.

OBJECTS AND SUMMARY OF THE INVENTION

It is an object of the present invention to minimize vibration in a mirror mounted on an automobile.

It is another object of the present invention to provide a damper for a mirror.

In some embodiments it is an object of the present invention to provide a mirror damper that has an adjustable spring.

BRIEF DESCRIPTION OF THE DRAWING FIGURES

In order that the invention be better understood, reference is now made to the following drawing figures in which.

BEST MODE AND OTHER EMBODIMENTS

The present technology is a modification to the rear view mirror described in the Applicant's Australian application No. 2007904749, incorporated herein by reference.

Figure 1:
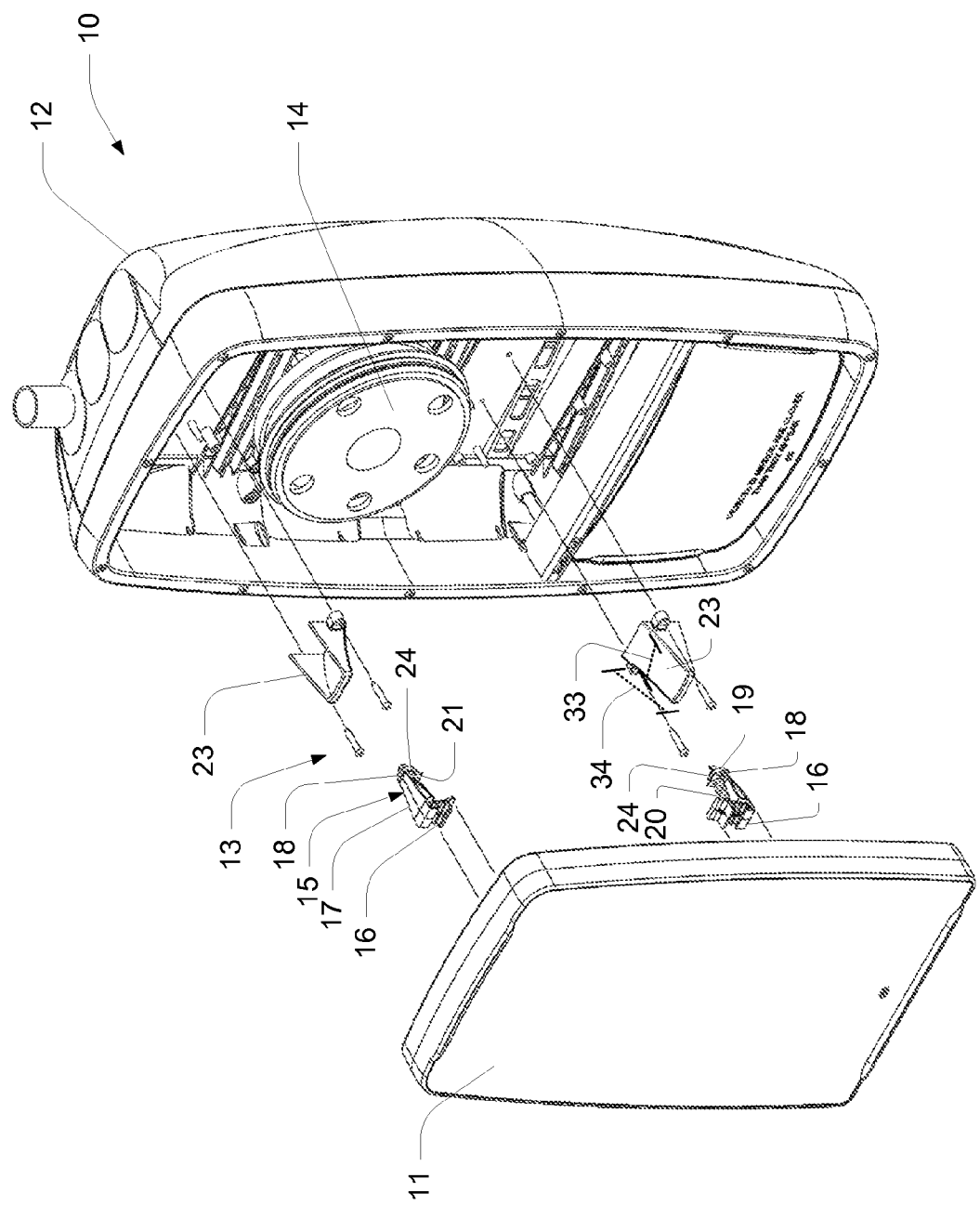
FIG. 1 is an exploded perspective view of a mirror that has a mirror damper.

As shown in FIG. 1, a rear view mirror with motorised (or manual) actuation 10 comprises a mirror assembly 11 that is mounted onto a frame assembly 12. The mirror assembly may comprise a backing for the mirror etc. The frame assembly comprises all of the parts of the rear view mirror except for the mirror assembly. A damper 13 is provided between the mirror 11 and the frame assembly 12 for the purpose of shock absorption or vibration reduction. In the embodiment shown, there is one damper 13 on each side of (or above and below) the actuator 14 for the mirror 11. Each damper 13 comprises a bracket 15, one end of which is an optional mounting portion 16 where the bracket 15 is mounted onto or in mechanical communication with a back side of the mirror 11. Alternatively the bracket 15 can be integral with a backing element of the mirror and thus lack a distinct mounting portion 16. From this mounting portion 16 or base area or base of the bracket (or otherwise), an upright member or beam 17 extends away from the mirror 11. The upright member 17 and the mounting portion 16 may be perpendicular to each other. The upright member 17 extends toward a free end 18 of the bracket 15. A rubber contact material such as an O-ring 24 is mounted onto the free end 18. The frictional and elastic properties etc. of the contact material determine the damping and frictional characteristics of the movement of the mirror with respect to the boss 22 onto which it impinges. The contact material may be the same material as the bracket or be a softer attachable/replaceable part such as the O-ring 24. A small pad, textile or felt or other material may be used depending on the damping characteristics required for a particular application of this technology. Lubricants may be applied to the contact material if required. The rubber contact material 24 is fitted between the roof 21 and the free end 18.

The damper may be installed or utilised without regard for which components of the damper are associated with the mirror or frame assemblies. That is the bracket or boss may be fastened to or affixed to or formed into or part of either assembly, as required.

Further, a spring 20 is received by and fitted between a first, cantilevered roof or spring mounting element 21 located adjacent to the free end 18 and the one or more spring mounting elements 28,29 located opposite the first and near or on a base area of the bracket 15 or on the mounting portion 16.

Each damper 13 further comprises a boss 22 that cooperates with the bracket 15. The material of the boss may be tailored to a particular application of the technology, particularly with regard to the co-efficient of friction of the contact surface of the boss. The boss 22 can be integral with or mounted onto the frame 12. In this embodiment the boss 22 is screwed onto the frame 12. Each boss further has a central curved ramp (or "ramped face") 23. This ramp 23 is preferably curved across its width 33 and also along its length 34, with the result that the ramp 23 is generally convex. This configuration accommodates the mirror's vibrations in various directions. The curvature of the ramp 23 may vary, depending on factors such as the size of the mirror and the amount of vibration the damper is designed to handle. In the preferred embodiment, the curved ramp 19 corresponds to an arc of an imaginary circle if curved in one plane, or two planes (e.g. a section of a sphere) if a complex curve is used.

Figure 2:
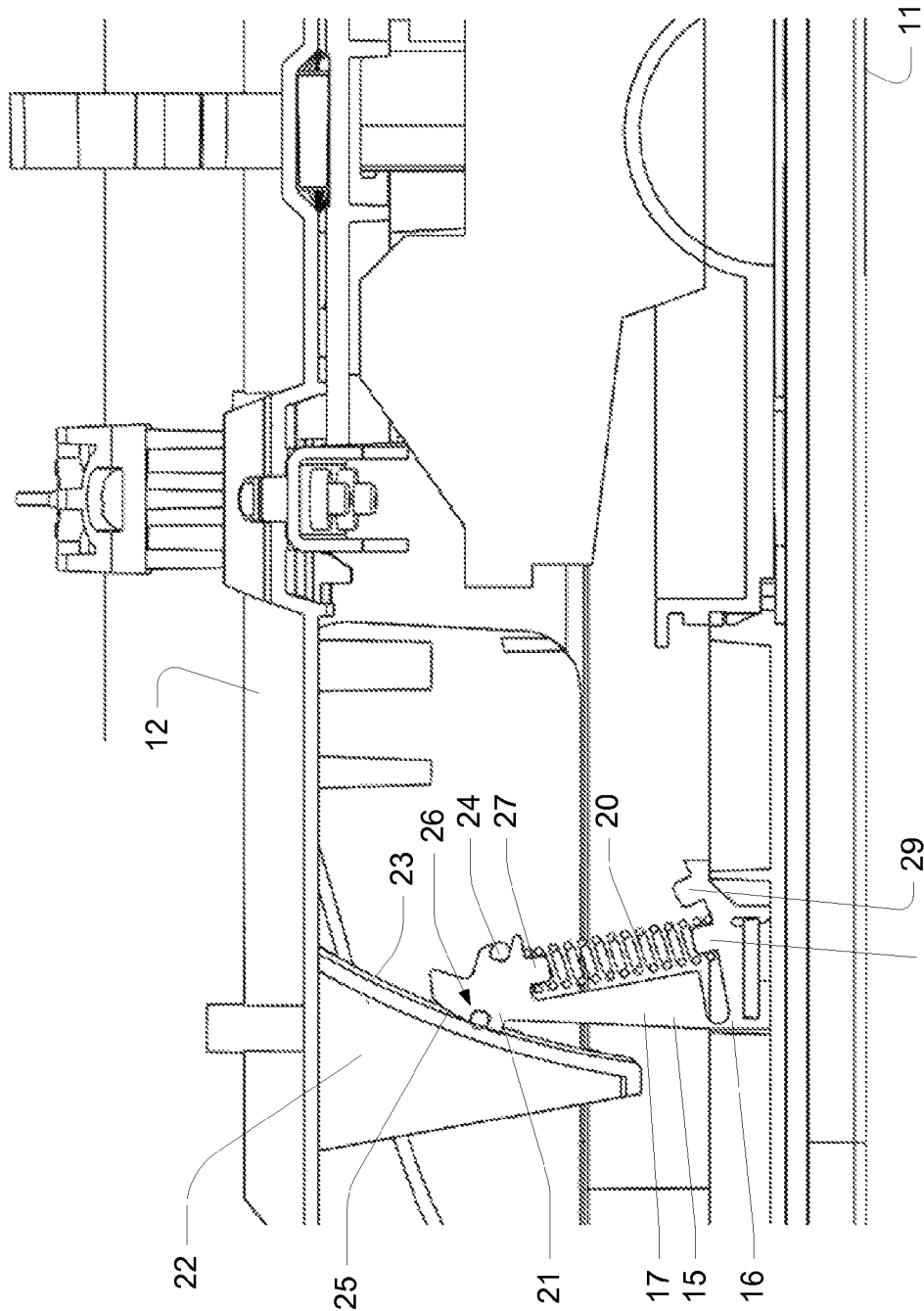
FIG. 2 is a cross section view of the mirror where the damper is visible.

As shown in FIG. 2, the bracket 15 and the boss 22 for each damper 13 are slightly offset from each other when the mirror 11 and the frame 12 are assembled. The free end 18 of the bracket 15 comes into contact with the ramped face 23 when the travel of the bracket, because of the action of the motor or actuator etc. is enough to unseat the contact material 24 from the boss. In particular, the free end 18 has a preferably curved ramp contact surface 25 for contacting, when required, the ramped face 23. A groove 26 is formed below the ramp contact 25. The polymer contact material 24 is preferably secured within this groove 26. In this embodiment the groove is a circumferential groove located adjacent to the free end 18 of the bracket, and the rubber contact material 24 is an O-ring. As the mirror 11 vibrates the rubber contact material 24 contacts and rides on the ramped face 23. The friction between the soft polymer of the contact material 24 and the ramped face 23 dampens the vibration of the mirror.

In this embodiment, the cantilevered roof 21 is provided such that its orientation is approximately perpendicular to the ramped face 23 when the damper 13 is assembled. A first spring locating or mounting element 27 extends away from the roof 21 and toward the mounting portion 16 of the bracket 15. It receives one end of the spring. A second and a third spring mounting elements 28, 29 are located adjacent to one another on the mounting portion 16 and extend generally toward the roof 21 and mounting element 27. The second and third spring mounting elements are positioned adjacent to each other and each can, in turn, receive an opposite end of the spring, as required. The second and third spring mountings 28, 29 are both angled, to different degrees, toward the ramped face 23. A resilient member such as the coil spring 20 can be fitted between the first and second mounting elements 27, 28 (see FIGS. 2 and 3) and take a first position. The resilient member or metal coil spring 20 can alternatively and optionally be fitted between the first and third spring mounting elements 27, 29 and take a second position (see FIG. 4). Depending on its position, the spring 20 is tensioned differently and is angled differently with respect to the ramped face 23. A different damping force is achieved by tensioning the spring 20 differently. The spring 20 is therefore adjustable for the damper to handle different tensions. Different springs may be used depending on the vibration characteristics of the mirror. A range of other resilient materials with shape memory may be used in place of the coil spring.

Figure 3:
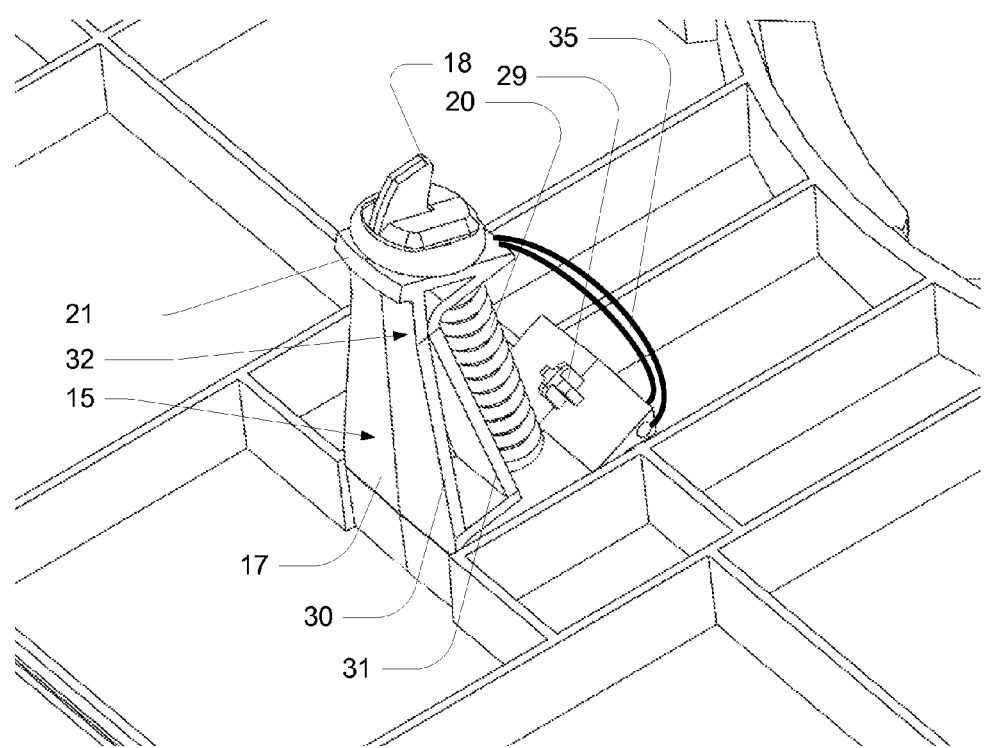
FIG. 3 is a perspective view showing the damper, where the spring is in a first position.
Figure 4:
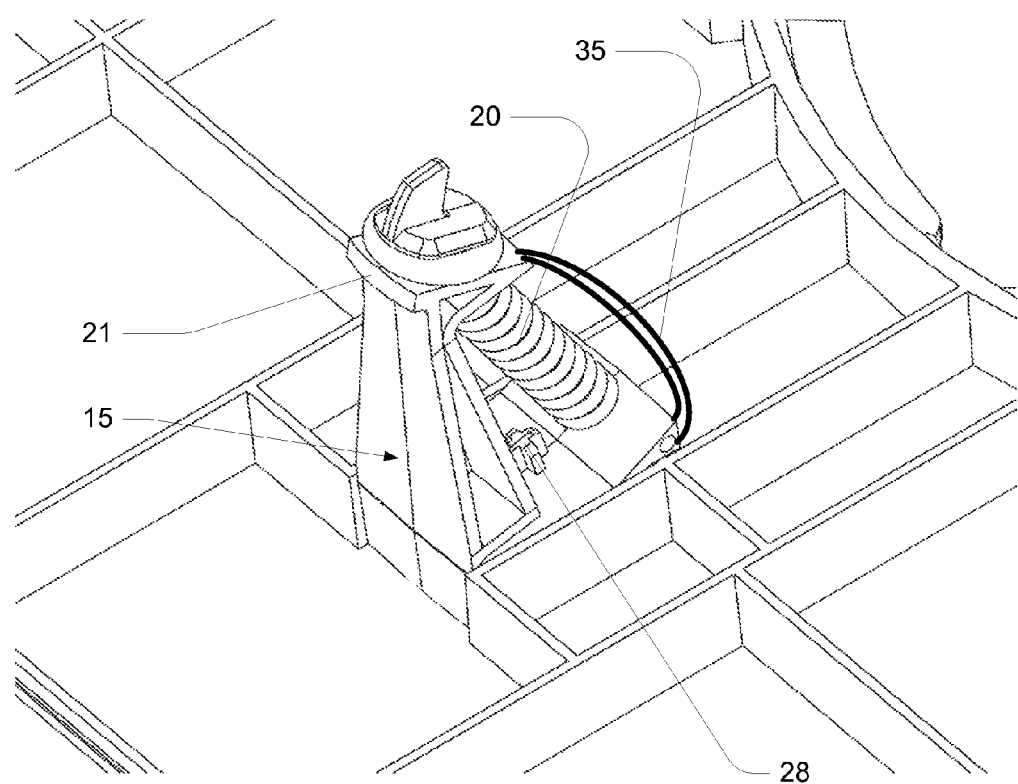
FIG. 4 is a perspective view showing damper with the spring in the second position.

Referring to FIGS. 3 and 4, the free end 18 may include a hook-like end so that the free end 18 may be easier to flex with a human finger or tool, so as to enable easier insertion or removal of the spring 20. In the present example the upright member 17 is like a flexible beam that is bendable to afford flexibility to the structure. An outer 30 and an inner portion or membrane 31 of the upright member 17 meet each other at a neck location 32 adjacent to the roof 21. The bracket 15 may be flexed at a narrowing or relief area between the upright member and the base of the upright member so that the spring 20 can be inserted or removed. In some embodiments, there may further be an arched, flexible reinforcing bow 35 that is connected between the base area the bracket 15 and the roof area so that it is located "across" the opposite ends of the spring 20 or other resilient bias or material.

The vibration of the mirror 11 causes the spring 20 to exert forces against the free end 18, thereby causing the free end 18, and in the normal range of mirror travel, the rubber contact material 24, to rub against the ramped face 23. Therefore, the vibration that is translated to the frame 12 is reduced. This in turn helps reduce the vibration translated to components carried by the frame 12.

While the present invention has been disclosed with reference to particular details of construction, these should be understood as having been provided by way of example and not as limitations to the scope or spirit of the invention.

What is claimed is:

1. A rear view mirror comprising:
a frame assembly onto which is mounted a mirror assembly;
the mirror assembly comprising a mirror;
an actuator for mounting the mirror located between the frame assembly and the mirror assembly;
a damper for vibration reduction extending between the frame assembly and the mirror assembly;
the damper comprising an upright member and a separate boss;
the boss comprising a curved ramp, the curved ramp having a face with a length, the face being curved along its length;
the upright member being a flexible beam, having a free end onto which is mounted a replaceable contact material that contacts the face of the boss;
the upright member having first and second mounting element for receiving a spring;
the spring extending a force on the free end that causes the replaceable contact material to rub against the face and reduce vibration of the mirror.

2. The mirror of claim 1, wherein:
the replaceable contact material is an o-ring.

3. The mirror of claim 1 wherein:
the upright member further comprises a third mounting element;
the second and third mounting elements each adapted to extend toward the first mounting element, but angled differently with respect to the face.

4. The mirror of claim 1, wherein:
the spring is a coil spring.

5. The mirror of claim 4, wherein:
the free end further comprises a hook-like end to enable removal of the spring.

6. The mirror of claim 1, wherein:
the face has a width and is curved along the width.

7. The mirror of claim 1, wherein:
the curved ramp corresponds to an arc of a circle.

8. The mirror of claim 1, wherein:
the curved ramp corresponds to a section of a sphere.

9. The mirror of claim 1, wherein:
the free end further comprises a curved ramp contacting surface.

10. The mirror of claim 1, wherein:
the free end further comprises a groove for receiving the replaceable contact material.

11. The mirror of claim 1, wherein:
the upright member further comprises a base and a relief area adjacent to the base, the relief area allowing the upright member to flex for an insertion of the spring.

* * * * *